United States Patent
Ikeda

(10) Patent No.: US 12,191,479 B2
(45) Date of Patent: Jan. 7, 2025

(54) NEGATIVE ELECTRODE ACTIVE MATERIAL, NEGATIVE ELECTRODE, AND SECONDARY BATTERY

(71) Applicant: MURATA MANUFACTURING CO., LTD., Kyoto (JP)

(72) Inventor: Yasuhiro Ikeda, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 516 days.

(21) Appl. No.: 17/507,476

(22) Filed: Oct. 21, 2021

(65) Prior Publication Data

US 2022/0045316 A1 Feb. 10, 2022

Related U.S. Application Data

(63) Continuation of application No. PCT/JP2020/016015, filed on Apr. 9, 2020.

(30) Foreign Application Priority Data

Apr. 26, 2019 (JP) .................................. 2019-086865

(51) Int. Cl.
  *H01M 4/36* (2006.01)
  *H01M 4/38* (2006.01)
  *H01M 4/587* (2010.01)
  *H01M 10/0525* (2010.01)
  *H01M 4/02* (2006.01)

(52) U.S. Cl.
  CPC ........... *H01M 4/364* (2013.01); *H01M 4/386* (2013.01); *H01M 4/587* (2013.01); *H01M 2004/027* (2013.01); *H01M 10/0525* (2013.01)

(58) Field of Classification Search
  None
  See application file for complete search history.

(56) References Cited

U.S. PATENT DOCUMENTS

| | | | |
|---|---|---|---|
| 2003/0054249 A1* | 3/2003 | Yamamoto | H01M 4/386 429/231.95 |
| 2008/0166634 A1* | 7/2008 | Kim | H01M 4/366 423/325 |

(Continued)

FOREIGN PATENT DOCUMENTS

| | | |
|---|---|---|
| CN | 101232093 | 7/2008 |
| JP | 5021259 B2 | 9/2012 |

(Continued)

OTHER PUBLICATIONS

Chinese Office Action issued Dec. 27, 2023 in corresponding Chinese Application No. 202080023393.1.

(Continued)

*Primary Examiner* — Carlos Barcena
(74) *Attorney, Agent, or Firm* — K&L Gates LLP

(57) ABSTRACT

A negative electrode active material includes a first negative electrode active material particle, and the first negative electrode active material includes a silicon-based material. A Si2p spectrum obtained by measuring the first negative electrode active material particle in a state of 0.6 V (vs. Li/Li$^+$) by X-ray photoelectron spectroscopy has a peak in a range from 99.0 eV to 105.0 eV, and a half width of the peak is 1.5 eV or more and 8.0 eV or less.

12 Claims, 2 Drawing Sheets

(56) References Cited

U.S. PATENT DOCUMENTS

| | | | |
|---|---|---|---|
| 2015/0030856 A1 | 1/2015 | Singh et al. | |
| 2016/0254525 A1* | 9/2016 | Hirose | H01M 4/131 |
| | | | 429/231.1 |
| 2017/0040610 A1* | 2/2017 | Otsuka | H01M 4/38 |
| 2018/0047981 A1 | 2/2018 | Ito | |
| 2019/0006666 A1* | 1/2019 | Obrovac | H01M 4/386 |
| 2020/0083521 A1* | 3/2020 | Ito | H01M 4/60 |

FOREIGN PATENT DOCUMENTS

| | | |
|---|---|---|
| JP | 2016192385 A | 11/2016 |
| WO | 2013119806 A1 | 8/2013 |
| WO | 2019171436 A1 | 9/2019 |

OTHER PUBLICATIONS

International Search Report for Application No. PCT/JP2020/016015, dated Jul. 7, 2020.
Japanese Office Action issued May 30, 2023 in corresponding Japanese Application No. 2023-700316.

* cited by examiner

NEGATIVE ELECTRODE ACTIVE MATERIAL, NEGATIVE ELECTRODE, AND SECONDARY BATTERY

CROSS REFERENCE TO RELATED APPLICATIONS

The present application is a continuation of PCT patent application no. PCT/JP2020/016015, filed on Apr. 9, 2020, which claims priority to Japanese patent application no. JP2019-086865 filed on Apr. 26, 2019, the entire contents of which are being incorporated herein by reference.

BACKGROUND

The present disclosure relates to a negative electrode active material, a negative electrode, and a secondary battery.

In recent years, there has been an urgent need of developing technique to increase a capacity of a secondary battery. As a negative electrode active material attaining a higher capacity than carbon-based materials, Si-based materials has attracted attention.

SUMMARY

In the conventional battery, electrode active material has a problem in that a discharge load capacity is low. In recent years, batteries have been used as power sources for various electronic devices, electric vehicles, and the like, and thus it is desired to improve discharge load characteristics.

An object of the present disclosure is to provide a negative electrode active material, a negative electrode, and a secondary battery, capable of improving discharge load characteristics.

According to an embodiment of the present disclosure, a negative electrode active material is provided. The negative electrode active material includes a first negative electrode active material particle including a silicon-based material, in which a Si2p spectrum obtained by measuring the first negative electrode active material particle in a state of 0.6 V (vs. Li/Li$^+$) by X-ray photoelectron spectroscopy has a peak in a range from 99.0 eV to 105.0 eV, and a half width of the peak is 1.5 eV or more and 8.0 eV or less.

According to an embodiment of the present disclosure, a negative electrode is provided. The negative electrode includes the negative electrode active material according to an embodiment as described herein.

According to an embodiment of the present disclosure, a secondary battery is provided. The secondary battery includes a positive electrode, a negative electrode, and an electrolyte, in which the negative electrode includes the negative electrode active material according to an embodiment as described herein.

According to the present disclosure, discharge load characteristics of the secondary battery can be improved.

The effects described in the present disclosure are merely exemplary and are not limited, and there may be additional effects.

DETAILED DESCRIPTION

As described herein, the present disclosure will be described based on examples with reference to the drawings, but the present disclosure is not to be considered limited to the examples, and various numerical values and materials in the examples are considered by way of example.

Figure 1:
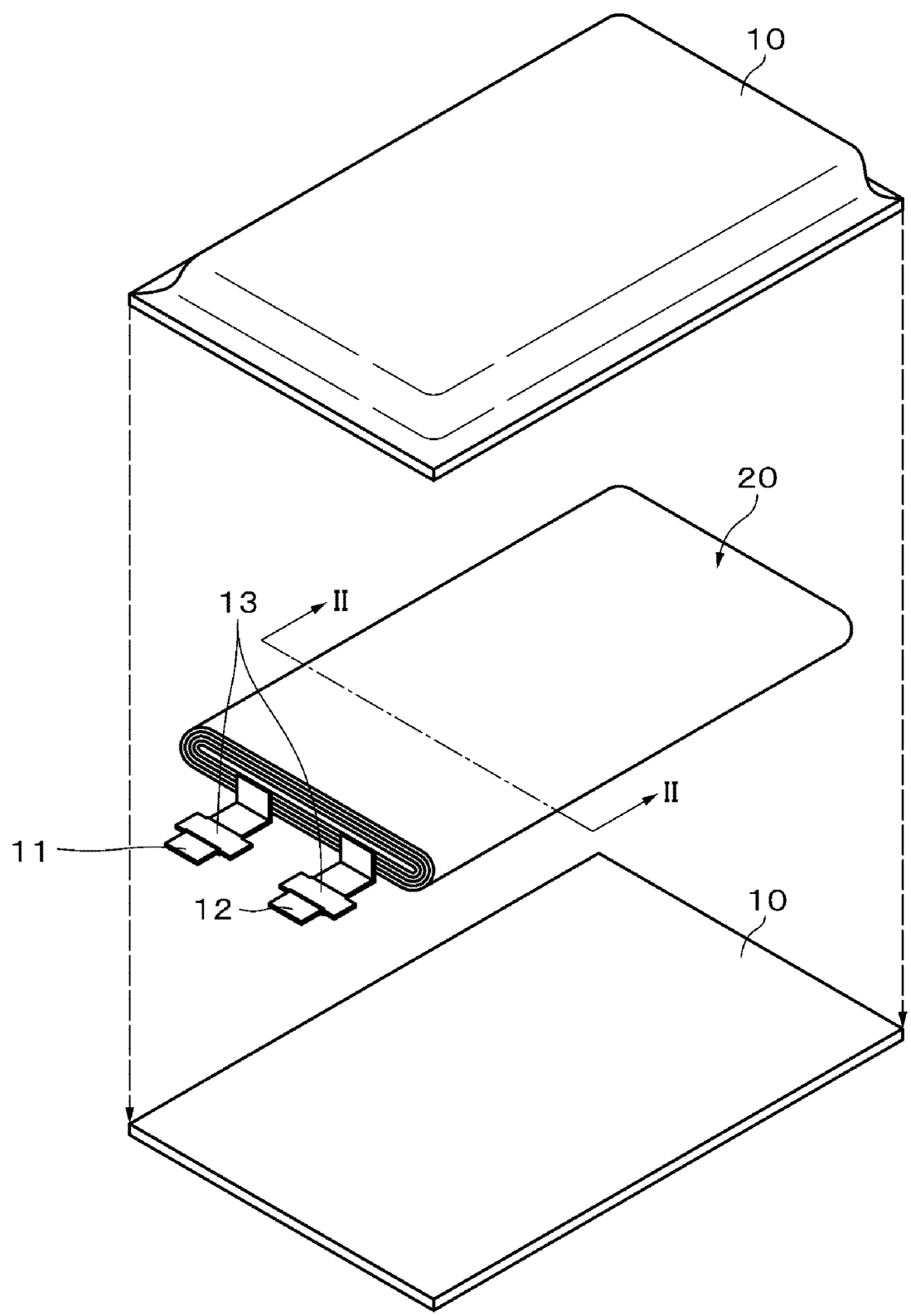
FIG. 1 is an exploded perspective view illustrating an example of a configuration of a nonaqueous electrolyte secondary battery according to an embodiment of the present disclosure.

First, an example of a configuration of a nonaqueous electrolyte secondary battery (hereinafter, simply referred to as a "battery") according to a first embodiment of the present disclosure will be described with reference to FIGS. 1 and 2. The battery is a so-called laminated type battery, and as illustrated in FIG. 1, includes a wound electrode body 20 to which a positive electrode lead 11 and a negative electrode lead 12 are attached, an electrolytic solution (not illustrated) as an electrolyte, and an exterior member 10 that has a film-like shape and accommodates the electrode body 20 and the electrolytic solution. Such battery can be reduced in size, weight, and thickness.

The positive electrode lead 11 and the negative electrode lead 12 are each led out from the inside of the exterior member 10 toward the outside, for example, in the same direction. The positive electrode lead 11 and the negative electrode lead 12 are each formed of, for example, a metal material such as Al, Cu, Ni, or stainless steel, and each have a thin-plate or net-like shape.

The exterior member 10 is configured with, for example, a rectangular aluminum laminated film obtained by bonding nylon film, aluminum foil, and polyethylene film in this order. For example, the exterior member 10 is provided such that the polyethylene film side and the electrode body 20 face each other, and outer edge portions of the exterior members 10 are adhered to each other by fusion bonding or by using an adhesive. An adhesive film 13 for suppressing entry of outside air is inserted between the exterior member 10 and each of the positive electrode lead 11 and the negative electrode lead 12. The adhesive film 13 is formed of a material having adhesion to the positive electrode lead 11 and the negative electrode lead 12, for example, polyolefin resin such as polyethylene, polypropylene, modified polyethylene, or modified polypropylene.

It should be understood that the exterior member 10 may be configured with laminated film having another structure, polymer film such as polypropylene, or metal film instead of the aluminum laminated film described above. Alternatively, it may be configured with laminated film in which a polymer film is laminated on one surface or both surfaces of an aluminum film as a core material.

Figure 2:
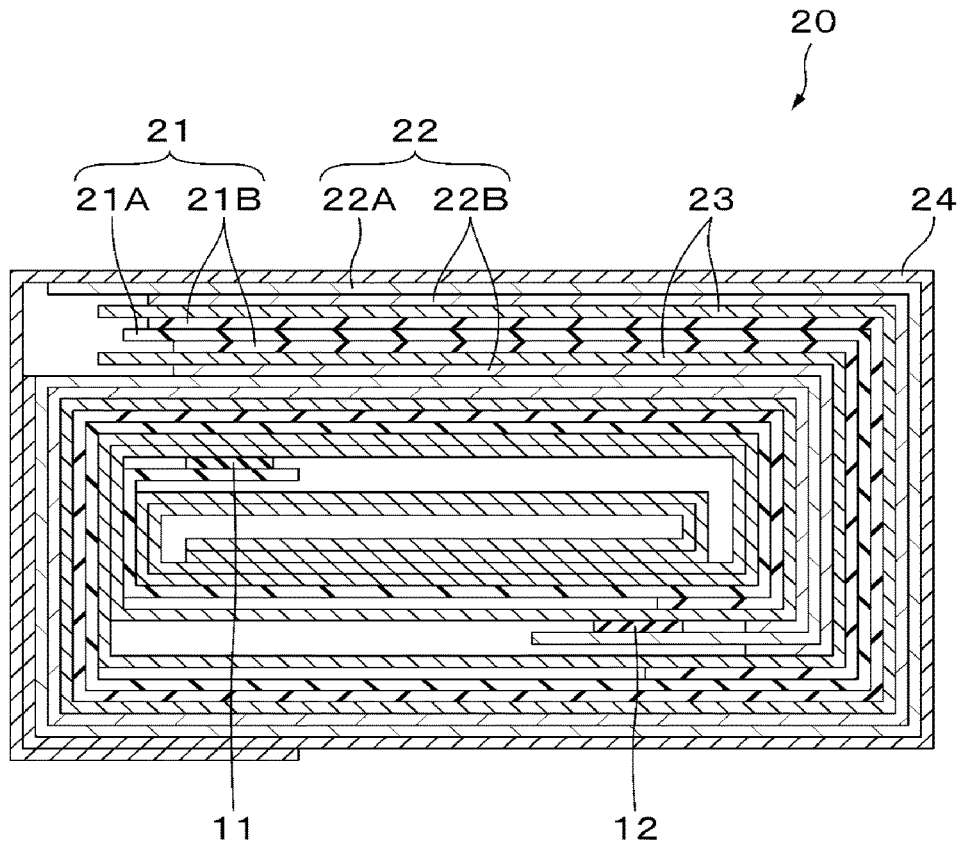
FIG. 2 is a sectional view taken along line II-II of FIG. 1.
Figure 3:
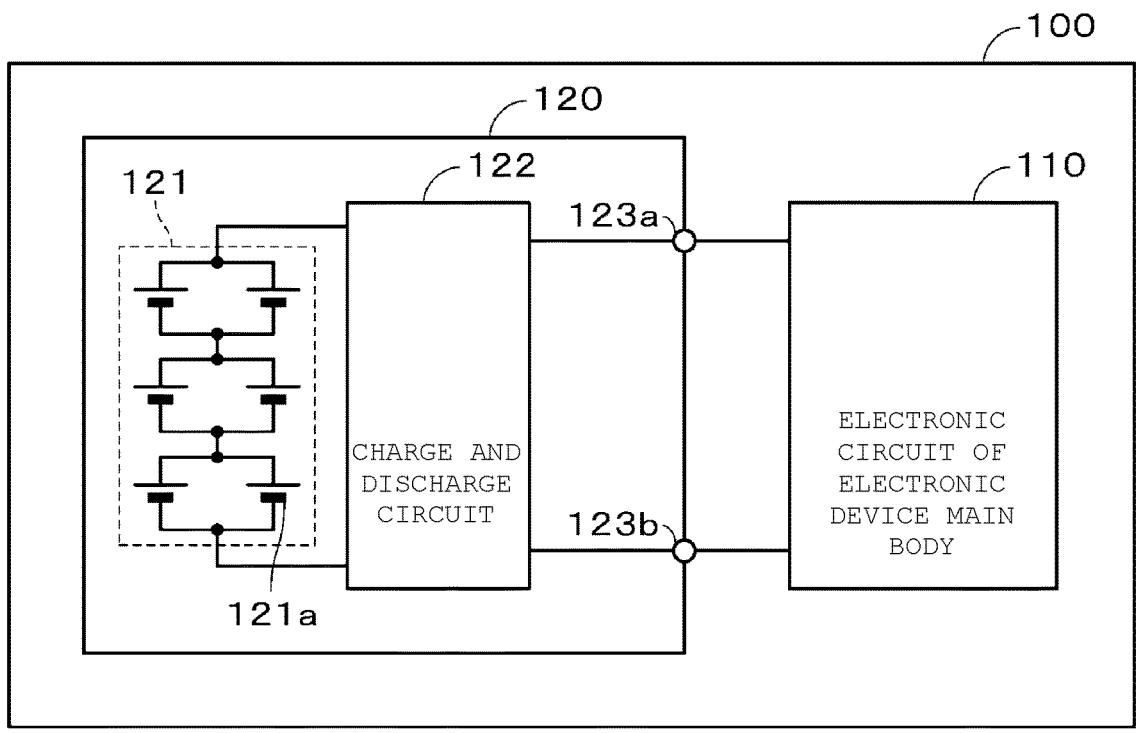
FIG. 3 is a block diagram illustrating an example of a configuration of an electronic device according to an embodiment of the present disclosure.

As illustrated in FIG. 2, the electrode body 20 includes a positive electrode 21 having an elongated shape, a negative electrode 22 having an elongated shape, and a separator 23 provided between the positive electrode 21 and the negative electrode 22 and having an elongated shape. The electrode body 20 has a configuration in which the positive electrode 21 and the negative electrode 22 are laminated with the separator 23 interposed therebetween and wound in a longitudinal direction so as to have a flattened and swirling shape, and an outermost peripheral portion of the electrode body 20 is protected by a protection tape 24. The positive electrode 21, the negative electrode 22, and the separator 23 are impregnated with an electrolytic solution.

Hereinafter, the positive electrode 21, the negative electrode 22, the separator 23, and the electrolytic solution constituting the battery will be sequentially described.

The positive electrode 21 includes, for example, a positive electrode current collector 21A and a positive electrode active material layer 21B provided on each side of the positive electrode current collector 21A. The positive electrode current collector 21A is configured with, for example, metal foil such as aluminum foil, nickel foil, or stainless-steel foil. The positive electrode active material layer 21B contains one type of, or two or more types of positive electrode active materials capable of occluding and releasing lithium. The positive electrode active material layer 21B may further contain at least one of binder and the conductive agent as necessary.

As the positive electrode active material, for example, a lithium-containing compound such as a lithium oxide, a lithium phosphorus oxide, a lithium sulfide, or an intercalation compound containing lithium is suitable, and two or more of these may be mixed and used. To increase the energy density, preferred is a lithium-containing compound containing lithium, a transition metal element, and oxygen. Examples of such a lithium-containing compound include a lithium composite oxide represented by Formula (A) and having a layered rock salt structure; and a lithium composite phosphate represented by Formula (B) and having an olivine-type structure. The lithium-containing compound more preferably contains, as a transition metal element, at least one selected from the group consisting of Co, Ni, Mn, and Fe. Examples of such a lithium-containing compound include a lithium composite oxide represented by Formula (C), (D), or (E) and having a layered rock salt structure; a lithium composite oxide represented by Formula (F) and having a spinel-type structure; and a lithium composite phosphate represented by Formula (G) and having an olivine-type structure. Specific examples thereof include LiNi0.50Co0.20Mn0.30O2, LiCoO2, LiNiO2, LiNiaCo1−aO2 (0<a<1), LiMn2O4, and LiFePO4.

$$Li_pNi_{(1-q-r)}Mn_qM1_rO_{(2-y)}X_z \quad (A)$$

(In Formula (A), M1 represents at least one of elements selected from Groups 2 to 15 excluding Ni and Mn. X represents at least one selected from the group consisting of Group 16 elements except for oxygen and Group 17 elements. p, q, y, and z are values within the ranges of $0 \le p \le 1.5$, $0 \le q \le 1.0$, $0 \le r \le 1.0$, $-0.10 \le y \le 0.20$, and $0 \le z \le 0.2$.)

$$Li_aM2_bPO_4 \quad (B)$$

(In Formula (B), M2 represents at least one of elements selected from Groups 2 to 15. a and b are values within the ranges of $0 \le a \le 2.0$ and $0.5 \le b \le 2.0$.)

$$Li_jMn_{(1-g-h)}Ni_gM3_hO_{(2-j)}F_k \quad (C)$$

(In Formula (C), M3 represents at least one selected from the group consisting of Co, Mg, Al, B, Ti, V, Cr, Fe, Cu, Zn, Zr, Mo, Sn, Ca, Sr, and W. f, g, h, j, and k are values within the ranges of $0.8 \le f \le 1.2$, $0 < g < 0.5$, $0 \le h \le 0.5$, $g+h<1$, $-0.1 \le j \le 0.2$, and $0 \le k \le 0.1$. It should be understood that the composition of lithium varies depending on the state of charge and discharge, and the value of f represents a value in a fully discharged state.)

$$Li_mNi_{(1-n)}M4_nO_{(2-p)}F_q \quad (D)$$

(In Formula (D), M4 represents at least one selected from the group consisting of Co, Mn, Mg, Al, B, Ti, V, Cr, Fe, Cu, Zn, Mo, Sn, Ca, Sr, and W. m, n, p, and q are values within the ranges of $0.8 \le m \le 1.2$, $0.005 \le n \le 0.5$, $-0.1 \le p \le 0.2$, and $0 \le q \le 0.1$. It should be understood that the composition of lithium varies depending on the state of charge and discharge, and the value of m represents a value in a fully discharged state.)

$$Li_rCo_{(1-s)}M5_sO_{(2-t)}F_u \quad (E)$$

(In Formula (E), M5 represents at least one selected from the group consisting of Ni, Mn, Mg, Al, B, Ti, V, Cr, Fe, Cu, Zn, Mo, Sn, Ca, Sr, and W. r, s, t, and u are values within the ranges of $0.8 \le r \le 1.2$, $0 \le s < 0.5$, $-0.1 \le t \le 0.2$, and $0 \le u \le 0.1$. It should be understood that the composition of lithium varies depending on the state of charge and discharge, and the value of r represents a value in a fully discharged state.)

$$Li_vMn_{2-w}M6_wO_xF_y \quad (F)$$

(In Formula (F), M6 represents at least one selected from the group consisting of Co, Ni, Mg, Al, B, Ti, V, Cr, Fe, Cu, Zn, Mo, Sn, Ca, Sr, and W. v, w, x, and y are values within the ranges of $0.9 \le v \le 1.1$, $0 \le w \le 0.6$, $3.7 \le x \le 4.1$, and $0 \le y \le 0.1$. It should be understood that the composition of lithium varies depending on the state of charge and discharge, and the value of v represents a value in a fully discharged state.)

$$Li_zM7PO_4 \quad (G)$$

(In Formula (G), M7 represents at least one selected from the group consisting of Co, Mg, Fe, Ni, Mg, Al, B, Ti, V, Nb, Cu, Zn, Mo, Ca, Sr, W, and Zr. z is a value within a range of $0.9 \le z \le 1.1$. It should be understood that the composition of lithium varies depending on the state of charge and discharge, and the value of z represents a value in a fully discharged state.)

As the positive electrode active material capable of occluding and releasing lithium, inorganic compounds containing no lithium, such as MnO2, V2O5, V6O13, NiS, and MoS, can also be used, in addition to these.

The positive electrode active material capable of occluding and releasing lithium may be other than those described above. Further, two or more types of the positive electrode active materials exemplified above may be mixed in any combination.

As the binder, for example, at least one selected from the group consisting of polyvinylidene difluoride, polytetrafluoroethylene, polyacrylonitrile, sodium polyacrylate, styrene butadiene rubber, carboxymethyl cellulose, copolymers containing one of these resin materials as a main component, and the like can be used.

As the conductive agent, for example, at least one carbon material selected from the group consisting of graphite, carbon fibers, carbon black, acetylene black, Ketjen black, carbon nanotubes, graphene, and the like can be used. The conductive agent may be any material having conductivity, and is not limited to a carbon material. For example, a metal material, a conductive polymer material, or the like may be used as the conductive agent. Examples of the shape of the conductive agent include a granular shape, a scaly shape, a hollow shape, a needle shape, and a cylindrical shape, but are not particularly limited thereto.

The negative electrode 22 includes, for example, a negative electrode current collector 22A and a negative electrode active material layer 22B provided on each side of the negative electrode current collector 22A. The negative electrode current collector 22A is configured with, for example, metal foil such as copper foil, nickel foil, or stainless-steel foil. The negative electrode active material layer 22B contains a negative electrode active material capable of occluding and releasing lithium. The negative electrode active material layer 22B may further contain at least one of the binder and the conductive agent as necessary.

Incidentally, it is preferred in this battery that the electrochemical equivalent of the negative electrode 22 or the negative electrode active material is greater than the electrochemical equivalent of the positive electrode 21, and theoretically, lithium metal is not deposited on the negative electrode 22 during charge.

A negative electrode active material contains a first negative electrode active material particle containing a silicon-based material. The negative electrode active material preferably further contains a second negative electrode active material particle containing a carbon material. The second negative electrode active material particle has an advantage that the degree of expansion and contraction thereof is small, and the cycle characteristics are excellent, as compared with each of those of the first negative electrode active material particle. Therefore, by the negative electrode active material further containing the second negative electrode active material particle, the cycle characteristics can be improved. The first negative electrode active material particle may be present in a gap between the second negative electrode active material particles.

The silicon-based material contained in the first negative electrode active material particle is, for example, at least one of a simple substance of silicon and a silicon compound. The silicon compound contains, for example, Si and at least one of a metal element and a metalloid element. Specifically, the silicon compound contains as the second constituent element other than Si, for example, at least one selected from the group consisting of Sn, Ni, Cu, Fe, Co, Mn, Zn, In, Ag, Ti, Ge, Bi, Sb, Nb, Mo, Al, P, Ga, and Cr. Examples of the structure of the silicon compound include a solid solution, a eutectic (eutectic mixture), an intermetallic compound, and a structure in which two or more of these coexist.

The compound of Si may contain a nonmetallic element. For example, the compound of Si may contain O or C as a constituent element, or may contain O or C as a constituent element together with the above-described second constituent element.

A Si2p spectrum obtained by measuring the first negative electrode active material particle in a state of 0.6 V (vs. Li/Li$^+$) by X-ray photoelectron spectroscopy (XPS) has a peak in a range of 99.0 eV or more and 105.0 eV or less. Further, the half width of this peak is 1.5 eV or more and 8.0 eV or less, preferably 1.7 eV or more and 7.6 eV or less, more preferably 1.9 eV or more and 6.0 eV or less, and still more preferably 2.5 eV or more and 3.5 eV or less. It should be understood that the Si2p spectrum can be obtained by a measurement method described in Examples to be described later.

When the Si2p spectrum has a peak in the range of 99.0 eV or more and 105.0 eV or less and the half width of this peak is 1.5 eV or more, not only the most stable bonding state (bonding state of Si—Si) but also a metastable bonding state (bonding state of Li—Si) is likely to be formed, thereby facilitating occurrence of charge transfer reaction. Accordingly, the charge transfer resistance is reduced and the discharge capacity is improved, thus, discharge load characteristics are improved. On the other hand, when the Si2p spectrum has a peak in the range of 99.0 eV or more and 105.0 eV or less and the half width of this peak is 8.0 eV or less, excess increase of the number of metastable bonding states can be suppressed. Accordingly, the reaction of the metastable bonding state with the electrolytic solution or Li, resulting in generation of an irreversible substance with respect to Li, can be suppressed. That is, inhibition of movement of Li ions by such an irreversible generated substance can be suppressed. Therefore, discharge load characteristics are improved.

Preferably, an X-ray diffraction pattern obtained by measuring the first negative electrode active material in the state of 0.6 V (vs. Li/Li$^+$) by an X-ray diffraction method does not have a crystalline peak. When the X-ray diffraction pattern does not have a crystalline peak as described above, the content ratio of crystals in the first negative electrode active material particle is sufficiently reduced. In the first negative electrode active material in such a state, occurrence of breakage of the first negative electrode active material due to expansion and contraction during charge and discharge, followed by collapse thereof, can be suppressed. Therefore, a decrease in Li diffusibility in the first negative electrode active material particles can be suppressed, and the retention of Li at or near the particle surface can be suppressed. Therefore, overvoltage is reduced, and discharge load characteristics are improved. It should be understood that the X-ray diffraction pattern can be obtained by a measurement method described in Examples to be described later.

The carbon material contained in the second negative electrode active material particle includes, for example, at least one selected from the group consisting of non-graphitizable carbon, graphitizable carbon, graphite, pyrolytic carbons, cokes, glassy carbons, organic polymer compound fired bodies, carbon fibers, and activated carbon. Among them, examples of the cokes include pitch coke, needle coke, petroleum coke, and the like. The organic polymer compound fired body refers to a carbonized product obtained by firing a polymer material such as phenol resin or furan resin at an appropriate temperature, and some organic polymer compound fired bodies are classified as non-graphitizable carbon or graphitizable carbon. These carbon materials are preferred because the variation in the crystal structure occurred during charge and discharge is very small, and a high charge and discharge capacity as well as good cycle characteristics can be obtained. In particular, graphite is preferred because it has a large electrochemical equivalent and can obtain high energy density. In addition, non-graphitizable carbon is preferred because excellent cycle characteristics can be obtained. Furthermore, preferred are those having low charge and discharge potential, specifically, those having charge and discharge potential close to that of lithium metal because attaining high energy density of the battery can be easily achieved.

The graphite is, for example, at least one of natural graphite and artificial graphite. As the artificial graphite, for example, at least one of mesocarbon microbeads (MCMB) and mesophase-pitch-based carbon fiber (MCF) can be used.

As the binder, the same material as that of the positive electrode active material layer 21B can be used.

As the conductive agent, the same material as that of the positive electrode active material layer 21B can be used.

The separator 23 separates the positive electrode 21 and the negative electrode 22, and allows lithium ions to pass therethrough while preventing a short circuit of current due to contact between both electrodes. The separator 23 is configured with, for example, a porous film containing: polytetrafluoroethylene; a polyolefin resin (polypropylene (PP), polyethylene (PE), or the like); an acrylic resin; a styrene resin; a polyester resin; a nylon resin; or a resin obtained by blending these resins, and may have a structure in which two or more of these porous films are laminated.

Among them, preferred is a porous film formed of polyolefin because it has an excellent short circuit-prevention effect and can improve the safety of the battery by a shutdown effect. Particularly preferred is polyethylene as a material constituting the separator 23 because polyethylene can provide a shutdown effect within a range of 100° C. or more and 160° C. or less and is also excellent in electrochemical stability. Among them, low-density polyethylene, high-density polyethylene, and linear polyethylene are suitably used because they have an appropriate fusing temperature and are easily available. In addition, a material obtained by copolymerizing or blending a resin having chemical stability with polyethylene or polypropylene can be used. Alternatively, the porous film may have a structure of three or more layers in which a polypropylene layer, a polyethylene layer, and a polypropylene layer are sequentially laminated. For example, the porous film desirably has a three-layer structure of PP/PE/PP, and the mass ratio [wt %] between PP and PE desirably satisfies PP:PE=60:40 to 75:25. Alternatively, from the viewpoint of costs, the porous film can be formed of the single-layer substrate having 100 wt % of PP or 100 wt % of PE. For the method of producing the separator 23, either of a wet production method or a dry production method may be employed.

As the separator 23, nonwoven fabric may be used. As the fibers constituting the nonwoven fabric, aramid fibers, glass fibers, polyolefin fibers, polyethylene terephthalate (PET) fibers, nylon fibers, or the like can be used. Alternatively, two or more of these fibers may be mixed to form the nonwoven fabric.

The separator 23 may have a configuration including a substrate and a surface layer provided on one or both surfaces of the substrate. The surface layer includes inorganic particles having electrical insulation properties and a resin material that binds the inorganic particles to the surface of the substrate and binds the inorganic particles to each other. This resin material may, for example, be fibrillated and have a three-dimensional network structure in which a plurality of fibrils are connected to each other. The inorganic particles are supported on the resin material having the three-dimensional network structure. Alternatively, without being fibrillated, the resin material may bind the inorganic particles to the surface of the substrate, and bind the inorganic particles to each other. In this case, higher binding properties can be obtained. By providing the surface layer on one or both surfaces of the substrate as described above, the oxidation resistance, the heat resistance, and the mechanical strength of the separator 23 can be improved.

The substrate is a porous film configured with an insulating film that allows lithium ions to pass therethrough and has a predetermined mechanical strength, and the electrolytic solution is held in the pores of the substrate. Accordingly, the substrate preferably has characteristics of high resistance to the electrolytic solution, low reactivity, and difficulty in expansion.

As a material constituting the substrate, a resin material or a nonwoven fabric constituting the above-described separator 23 can be used.

The inorganic particle contains at least one selected from the group consisting of metal oxide, metal nitride, metal carbide, metal sulfide, and the like. As the metal oxide, aluminum oxide (alumina, $Al_2O_3$), boehmite (hydrated aluminum oxide), magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$), or the like can be suitably used. As the metal nitride, silicon nitride ($Si_3N_4$), aluminum nitride (AlN), boron nitride (BN), titanium nitride (TiN), or the like can be suitably used. As the metal carbide, silicon carbide (SiC), boron carbide ($B_4C$), or the like can be suitably used. As the metal sulfide, barium sulfate ($BaSO_4$) or the like can be suitably used. Among the metal oxide described above, alumina, titania (particularly having a rutile-type structure), silica, or magnesia is preferably used, and alumina is more preferably used.

Further, the inorganic particle may contain a mineral such as porous aluminosilicate such as zeolite ($M_{2/n}O \cdot Al_2O_3 \cdot xSiO_2 \cdot yH_2O$, M represents a metal element, $x \geq 2$, $y \geq 0$); layered silicate; barium titanate ($BaTiO_3$); or strontium titanate ($SrTiO_3$). The inorganic particle has oxidation resistance and heat resistance, and the surface layer containing the inorganic particles opposite the positive electrode has strong resistance to an oxidizing environment near the positive electrode during charge. The shape of the inorganic particle is not particularly limited, and any of spherical shape, plate-like shape, fibrous shape, cubic shape, random shape, and the like can be used.

The particle size of the inorganic particle is preferably in a range of 1 nm or more and 10 μm or less. This is because when the particle size is smaller than 1 nm, it is difficult to obtain the inorganic particles, whereas when the particle size is larger than 10 μm, the distance between the electrodes increases, and the active-material filling amount cannot be sufficiently obtained in a limited space, which causes the decrease of battery capacity.

Examples of the resin material constituting the surface layer include fluorine-containing resins such as polyvinylidene difluoride and polytetrafluoroethylene; fluorine-containing rubber such as a vinylidene difluoride-tetrafluoroethylene copolymer and an ethylene-tetrafluoroethylene copolymer; rubbers such as a styrene-butadiene copolymer or a hydrogenated product thereof, an acrylonitrile-butadiene copolymer or a hydrogenated product thereof, an acrylonitrile-butadiene-styrene copolymer or a hydrogenated product thereof, a methacrylic acid ester-acrylic acid ester copolymer, a styrene-acrylic acid ester copolymer, an acrylonitrile-acrylic acid ester copolymer, ethylene propylene rubber, polyvinyl alcohol, and polyvinyl acetate; cellulose derivatives such as ethyl cellulose, methyl cellulose, hydroxyethyl cellulose, and carboxymethyl cellulose; and resins having at least one of a melting point or a glass transition temperature of 180° C. or higher to have high heat resistance, such as polyphenylene ether, polysulfone, polyethersulfone, polyphenylene sulfide, polyether imide, polyimide, a polyamide, e.g., a wholly aromatic polyamide (aramid), polyamide imide, polyacrylonitrile, polyvinyl alcohol, polyether, an acrylic acid resin, and polyester. These resin materials may be used singly, or in combination of two or more of these. Among them, preferred are fluorine-based resins such as polyvinylidene difluoride from the viewpoints of oxidation resistance and flexibility, and the surface layer preferably contains aramid or polyamide imide from the viewpoint of the heat resistance.

As a method for forming the surface layer, for example, a method can be used in which a slurry containing a matrix resin, a solvent, and inorganic particles is applied onto a substrate (porous film), the substrate is passed through a bath containing a solvent, which is a poor solvent for the matrix resin as well as a good solvent for the above solvent to cause phase separation, and then the substrate is dried.

The inorganic particles described above may be contained in a porous film as the substrate. Alternatively, the surface layer may not contain any inorganic particles and may be formed of only the resin material.

The electrolytic solution is a so-called nonaqueous electrolytic solution, and contains an organic solvent (nonaqueous solvent) and an electrolyte salt dissolved in the organic solvent. The electrolytic solution may contain a publicly known additive to improve battery characteristics. It should be understood that an electrolyte layer containing an electrolytic solution and a polymer compound serving as a holding material for holding the electrolytic solution may be used instead of the electrolytic solution. In this case, the electrolyte layer may be in a gel state.

As the organic solvent, cyclic carbonic acid esters such as ethylene carbonate and propylene carbonate can be used, and it is preferred to use one of ethylene carbonate and propylene carbonate, and particularly preferred to use both in mixture. This is because cycle characteristics can be further improved.

As the organic solvent, it is preferred to mix a chain carbonic acid ester such as diethyl carbonate, dimethyl carbonate, ethyl methyl carbonate, or methyl propyl carbonate, to these cyclic carbonate esters and use such mixture. This is because high ion conductivity can be obtained.

The organic solvent preferably further contains 2,4-difluoroanisole or vinylene carbonate. This is because 2,4-difluoroanisole can further improve discharge capacity, and vinylene carbonate can further improve cycle characteristics. Therefore, it is preferred to use a mixture thereof because the mixture can further improve discharge capacity and cycle characteristics.

In addition to these, examples of the organic solvent include butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropylnitrile, N,N-dimethylformamide, N-methylpyrrolidinone, N-methyloxazolidinone, N,N-dimethylimidazolidinone, nitromethane, nitroethane, sulfolane, dimethyl sulfoxide, trimethyl phosphate.

It should be understood that a compound obtained by substituting at least part of hydrogen in these organic solvents with fluorine may be preferred because the reversibility of electrode reaction may be improved in some cases, depending on the type of electrode to be combined.

Examples of the electrolyte salt include lithium salts, and one lithium salt may be used singly, or two or more lithium salts may be used in mixture. Examples of the lithium salt include LiPF6, LiBF4, LiAsF6, LiClO4, LiB(C6H5)4, LiCH3SO3, LiCF3SO3, LiN(SO2CF3)2, LiC(SO2CF3)3, LiAlCl4, LiSiF6, LiCl, difluoro[oxolato-O,O'] lithium borate, lithium bis(oxalate)borate, and LiBr. Among them, preferred is $LiPF_6$ because high ion conductivity can be obtained and cycle characteristics can be further improved.

The positive electrode potential (vs Li/Li+) in a fully charged state is preferably more than 4.20 V, more preferably 4.25 V or more, still more preferably more than 4.40 V, particularly preferably 4.45 V or more, and most preferably 4.50 V or more. However, the positive electrode potential (vs Li/Li+) in the fully charged state may be 4.20 V or less. The upper limit value of the positive electrode potential (vs Li/Li$^+$) in the fully charged state is not particularly limited, but is preferably 6.00 V or less, more preferably 5.00 V or less, still more preferably 4.80 V or less, and particularly preferably 4.70 V or less.

When the battery having the above-described configuration is charged, lithium ions are released from the positive electrode active material layer 21B and occluded in the negative electrode active material layer 22B through the electrolytic solution, for example. When such battery is discharged, lithium ions are released from the negative electrode active material layer 22B and occluded in the positive electrode active material layer 21B through the electrolytic solution, for example.

Next, an example of a method for manufacturing the battery according to the first embodiment of the present disclosure will be described.

The positive electrode 21 is produced as follows. First, for example, a positive electrode mixture is prepared by mixing the positive electrode active material, the binder, and the conductive agent, then this positive electrode mixture is dispersed in a solvent such as N-methyl-2-pyrrolidone (NMP) to produce a paste-like positive electrode mixture slurry. Next, this positive electrode mixture slurry is applied to both surfaces of the positive electrode current collector 21A, then the solvent is dried, and such positive electrode current collector 21A is compression-molded by a roll pressing machine or the like to form the positive electrode active material layer 21B, thereby giving the positive electrode 21.

The negative electrode 22 is produced as follows. First, for example, a negative electrode active material and the binder are mixed to prepare a negative electrode mixture, then this negative electrode mixture is dispersed in a solvent such as N-methyl-2-pyrrolidone to produce a paste-like negative electrode mixture slurry. Next, this negative electrode mixture slurry is applied to both surfaces of the negative electrode current collector 22A, then the solvent is dried, and such negative electrode current collector 22A is compression-molded by a roll pressing machine or the like to form the negative electrode active material layer 22B, thereby giving the negative electrode 22.

The wound electrode body 20 is produced as follows. First, the positive electrode lead 11 is attached to one end portion of the positive electrode current collector 21A by welding, and the negative electrode lead 12 is attached to one end portion of the negative electrode current collector 22A by welding. Next, the positive electrode 21 and the negative electrode 22 are wound around a flattened core with the separator 23 interposed therebetween and wound many times in the longitudinal direction, and then the protection tape 24 is adhered to the outermost peripheral portion, thereby giving the electrode body 20.

The electrode body 20 is sealed with the exterior member 10 as follows. First, the electrode body 20 is sandwiched between the exterior members 10, then the outer peripheral edge portion excluding one side is thermally fusion-bonded to form a bag shape, so that the electrode body 20 is housed inside the exterior member 10. At that time, the adhesive film 13 is inserted between each of the positive electrode lead 11 and the negative electrode lead 12 and the exterior member 10. The adhesive film 13 may be attached beforehand to each of the positive electrode lead 11 and the negative electrode lead 12. Next, an electrolytic solution is injected into the exterior member 10 from one side having not been fusion-bonded, and then the side having not been fusion-bonded is thermally fusion-bonded in a vacuum atmosphere thereby hermetically sealed. As described above, the battery illustrated in FIG. 1 can be obtained.

Si surface forming charge including primary charge and secondary charge is performed on the battery obtained as described above. At this time, the conditions for Si surface forming charge are adjusted so that the Si2p spectrum of the first negative electrode active material particle in the state of 0.6 V (vs. Li/Li$^+$) has a peak in the range of 99.0 eV or more and 105.0 eV or less, and the half width of this peak is 1.5 eV or more and 8.0 eV or less. After Si surface forming charge, constant current discharge is performed until the voltage reaches a specified voltage. In this way, a battery as targeted can be obtained.

The battery according to the first embodiment includes the positive electrode 21, the negative electrode 22, and the electrolytic solution. The negative electrode 22 includes the negative electrode active material layer 22B containing the negative electrode active material. The negative electrode active material contains the first negative electrode active material particle containing a silicon-based material. The Si2p spectrum obtained by measuring first negative electrode active material particle in the state of 0.6 V (vs. Li/Li$^+$) by X-ray photoelectron spectroscopy has a peak in the range of 99.0 eV or more and 105.0 eV or less, and a half width of this peak is 1.5 eV or more and 8.0 eV or less. When the first negative electrode active material particle in the state of 0.6 V (vs. Li/Li$^+$) have a peak having such features, not only the most stable bonding state (bonding state of Si—Si) but also the metastable bonding state (bonding state of Li—Si) is likely to be formed. This facilitates occurrence of charge transfer reaction, whereby the charge transfer resistance decreases. In addition, excess increase of the number of metastable bonding states, resulting in generation of a substance irreversible to Li, can be suppressed. Therefore, discharge load characteristics are improved.

EXAMPLES

Hereinafter, Examples will specifically describe the present disclosure, but the present disclosure should not be limited only to these Examples.

Examples 1 to 10 and Comparative Examples 1 to 4

First, 70 mass % of a silicon compound (the first negative electrode active material particle), 15 mass % of Ketjen black (the second negative electrode active material particle), and 15 mass % of sodium polyacrylate (the binder) were mixed to prepare a negative electrode mixture. Subsequently, this negative electrode mixture was mixed with an appropriate amount of water, and then kneaded and dispersed by using a rotation and revolution mixer to prepare a negative electrode mixture slurry. Next, the negative electrode mixture slurry was applied to copper foil having a thickness of 20 μm and dried at 120° C. to form a negative electrode active material layer on the copper foil, thereby giving a laminate. Next, this laminate was punched into a circle having a diameter of 10 mm, and pressure was applied to the laminate by a hand pressing machine until the density of the negative electrode active material layer reached 1.0 g/cc, then the laminate was vacuum-dried to give a negative electrode.

Li metal foil having a thickness of 1 mm was punched into a circle having a diameter of 15 mm, and pressure-bonded to copper foil having a thickness of 20 μm to obtain a counter electrode.

First, ethylene carbonate (EC) and dimethyl carbonate (DMC) were mixed at a volume ratio satisfying EC:DMC=3:7 to prepare a mixed solvent. Subsequently, lithium hexafluorophosphate (LiPF$_6$) as an electrolyte salt was dissolved in the mixed solvent so as to have a concentration of 1.0 mol/L to prepare an electrolytic solution.

First, the negative electrode, a separator, and the counter electrode were superimposed in this order so that the negative electrode active material layer and the Li metal foil corresponded to each other, thereby giving a laminate. As the separator, a polyethylene microporous film having a thickness of 25 μm was used. Next, the electrolytic solution was accommodated in the exterior can together with this laminate, and then the exterior cup was fitted into the cavity of the exterior can with a gasket interposed therebetween, and then the cavity end of the exterior can was crimped. In this way, a coin cell was obtained.

The coin cell obtained as described above was subjected to Si surface forming charge including primary charge and secondary charge, and discharge as follows. It should be understood that the peak position and the half width of a Si2p spectrum of the silicon compound (first negative electrode active material particle) in the state of 0.6 V (vs. Li/Li$^+$) were changed by setting the conditions of Si surface forming charge for each sample as described below. By performing Si surface forming charge, a surface having not only the most stable bonding state (bonding state of Si—Si) but also a metastable bonding state (bonding state of Li—Si) was formed.

First, primary charge was performed. The coin cell was left in a high-temperature bath at 40° C. for one hour. Next, constant current charge was performed on the coin cell at 0.2 C in the same high-temperature bath at 40° C., thereafter constant voltage charge was performed at 0.6 V for one hour.

Following the primary charge, secondary charge was performed on the coin cell in the same high-temperature bath at 40° C. as follows. That is, constant current charge was performed on the coin cell at C rate of the secondary charge indicated in Table 1, thereafter constant voltage charge was performed on the coin cell at the voltage of the secondary charge indicated in Table 1 until the current value reached 0.02 C.

After the secondary charge, constant current discharge (initial discharge) was performed on the coin cell at 0.2 C until the battery voltage reached 1.0 V.

The discharge load characteristics of the coin cell in which the above-described charge and discharge had been performed were evaluated as follows. That is, the ratio (%) of the 0.5 C discharge capacity to the 0.1 C discharge capacity ((0.5 C discharge capacity)/(0.2 C discharge capacity)×100) was determined and the determined ratio was taken as the discharge load characteristics. The 0.1 C discharge capacity and the 0.5 C discharge capacity were measured as follows.

(0.1 C Discharge Capacity)

First, constant current charge was performed on the coin cell at 0.1 C in a high-temperature bath at 25° C., thereafter constant voltage charge was performed at 0.02 V until the current value reached 0.02 C. Subsequently, constant current discharge was performed at 0.1 C until the battery voltage reached 1.0 V, and the obtained value was taken as a 0.1 C discharge capacity.

(0.5 C Discharge Capacity)

First, constant current charge was performed on the coin cell at 0.1 C in a high-temperature bath at 25° C., thereafter constant voltage charge was performed at 0.02 V until the current value reached 0.02 C. Subsequently, constant current discharge was performed at 0.5 C until the battery voltage reached 1.0 V, and the obtained value was taken as a 0.5 C discharge capacity.

Here, the "C (rate)" is represented by a ratio of a discharge (charge) current value to a battery capacity (theoretical capacity) (discharge (charge) current (A)/battery capacity (theoretical capacity) (Ah)). For example, "0.1 C" refers to a current value at which the battery capacity (theoretical capacity) is fully discharged (charged) in 10 hours.

(Analysis of Silicon Compound)

First, the coin cell in which the above-described charge and discharge had been performed was left in a high-temperature bath at 25° C. for one hour. Subsequently, constant current charge was performed at 0.05 C, thereafter constant voltage charge was performed at 0.6 V until the current value reached 0.005 C. Next, the coin cell was disassembled to take out the negative electrode, then the negative electrode was washed with DMC, and dried to give a measurement sample (the negative electrode (silicon compound) in the state of 0.6 V (vs. Li/Li$^+$)).

The measurement sample was analyzed by X-ray photoelectron spectroscopy to give a Si2p spectrum of the negative electrode active material layer (silicon compound) in the state of 0.6 V (vs. Li/Li$^+$). The peak position and the half width of the peak were determined from the obtained spectrum. It should be understood that, in detecting the Si2p spectrum, analyzed is the Si2p spectrum emitted from the surface of the negative electrode active material layer when the negative electrode active material layer was irradiated with an AlKα ray (monochromatic) emitted under the conditions of a voltage of 10 kV and a current of 20 mA as an excited X-ray.

First, an X-ray diffraction pattern of a measurement sample (negative electrode active material layer) was obtained using an X-ray diffractometer (D8 ADVANCE manufactured by Bruker Corporation). It should be understood that the Cu—Kα ray was used as the characteristic X-ray. Further, the tube current was set to 40 mA, and the acceleration voltage was set to 40 kV. Next, the presence of a peak attributable to Si(111) in the range of diffraction angle (2θ) of 25° or more and 30° or less was confirmed. When a peak was confirmed, it was determined as "crystalline peak of the silicon compound is present", and when no peak was confirmed, it was determined as "no crystalline peak of the silicon compound is present".

Table 1 indicates conditions of Si surface forming charge of the coin cells and evaluation results of Examples 1 to 10 and Comparative Examples 1 to 4.

105.0 eV or less, and a half width of the peak in this range is 1.5 eV or more and 8.0 eV or less, discharge load characteristics are improved.

From the viewpoint of further improving the discharge load characteristics, the half width of the peak is preferably 1.7 eV or more and 7.6 eV or less, more preferably 1.9 eV or more and 6.0 eV or less, and still more preferably 2.5 eV or more and 3.5 eV or less.

When the X-ray diffraction pattern of the silicon compound in the state of 0.6 V (vs. Li/Li$^+$) does not have a crystalline peak, the discharge load characteristics can be further improved.

In the foregoing, the embodiments and Examples of the present disclosure have been specifically described. The present disclosure, however, is not limited to the embodiments and Examples set forth hereinabove, and various modifications based on a technical idea of the present disclosure may be made.

For example, the configurations, the methods, the steps, the shapes, the materials, the values, and the like exemplified in the embodiments and Examples are merely examples, and configurations, methods, steps, shapes, materials, values, and the like that are different from these examples, may be employed as necessary. Furthermore, the configurations, the methods, the steps, the shapes, the materials, the values, and the like in the embodiments and Examples may be implemented in combination without departing from the spirit of the present disclosure.

Furthermore, the chemical Formulas of the compounds and the like exemplified in the embodiments are considered representative, and are not limited to the listed valences and the like, as long as the chemical formulas have general names for the same compounds. Furthermore, in the numerical ranges listed in a stepwise manner in the embodiments, the upper limit value or the lower limit value of the numerical range in a certain stage may be replaced with the upper limit value or the lower limit value of the numerical range in another stage. Furthermore, for the materials exemplified

TABLE 1

|  | C rate of secondary charge [C] | Voltage of secondary charge [V] | Peak position [eV] | Half width of peak [eV] | Presence of crystalline peak of Si compound | Load characteristics [%] |
| --- | --- | --- | --- | --- | --- | --- |
| Example 1 | 0.05 | 0.020 | 104.8 | 1.5 | No | 91.5 |
| Example 2 | 0.15 | 0.020 | 102.0 | 1.7 | No | 92.2 |
| Example 3 | 0.18 | 0.020 | 102.0 | 1.9 | No | 92.8 |
| Example 4 | 0.20 | 0.020 | 102.0 | 2.5 | No | 95.0 |
| Example 5 | 0.40 | 0.020 | 101.7 | 3.5 | No | 94.8 |
| Example 6 | 0.60 | 0.020 | 101.2 | 6.0 | No | 93.0 |
| Example 7 | 1.00 | 0.020 | 101.0 | 7.6 | No | 92.3 |
| Example 8 | 1.20 | 0.020 | 99.2 | 7.9 | No | 91.8 |
| Example 9 | 0.40 | 0.005 | 101.5 | 3.3 | Yes | 91.0 |
| Example 10 | 0.40 | 0.005 | 102.0 | 3.3 | Yes | 92.0 |
| Comparative Example 1 | 0.05 | 0.020 | 102.2 | 1.1 | No | 89.3 |
| Comparative Example 2 | 1.50 | 0.020 | 99.1 | 8.8 | No | 90.2 |
| Comparative Example 3 | 1.60 | 0.020 | 98.8 | 2.5 | No | 89.4 |
| Comparative Example 4 | 1.80 | 0.020 | 105.5 | 2.5 | No | 89.2 |

The following can be seen from Table 1.

When the Si2p spectrum obtained by measuring the silicon compound (first negative electrode active material particle) in the state of 0.6 V (vs. Li/Li$^+$) by X-ray photoelectron spectroscopy has a peak at 99.0 eV or more and in the embodiments, one may be used singly, or two or more may be used in combination unless otherwise specified.

Furthermore, the laminated type battery has been described as an example, but the shape of the battery is not limited thereto, and the present disclosure may also be applied to batteries having various shapes, such as cylindrical-type battery, a square-type battery, a coin-type battery, and a button-type battery. Furthermore, the present disclosure may also be applied to a flexible battery or the like mounted on a wearable terminal such as a smartwatch and a head-mounted display.

Furthermore, in the embodiment, an example in which the present disclosure is applied to a wound battery has been described. However, the structure of the battery is not limited thereto, and for example, the present disclosure may also be applied to a stacked type batteries in which a positive electrode and a negative electrode are stacked with a separator interposed therebetween, a battery in which a positive electrode and a negative electrode are folded with a separator interposed therebetween, or the like.

Furthermore, in the first embodiment, the case has been described in which the first negative electrode active material particle having the above-described characteristics (that is, the first negative electrode active material particle in which the Si2p spectrum has a peak in the range of 99.0 eV or more and 105.0 eV or less, and the half width of the peak in this range is 1.5 eV or more and 8.0 eV or less) is produced by controlling the conditions of Si surface forming charge for the first negative electrode active material particle containing the silicon-based material. However, the method for producing the first negative electrode active material particle having the above-described characteristics is not limited thereto.

Examples of the method for producing the first negative electrode active material particle other than those described in the first embodiment include a method in which the concentration and temperature of a benzene solution of propyl ferrocene are adjusted, and the silicon-based material is stirred in the solution to change the binding energy of Si, and a method in which the silicon-based material is sputtered by arsenic ions to change the binding energy of Si.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A negative electrode active material comprising:
a first negative electrode active material particle including a silicon-based material having a silicon surface forming charge state,
wherein a Si2p spectrum obtained by measuring the first negative electrode active material particle by X-ray photoelectron spectroscopy has a peak in a range from 99.0 eV to 105.0 eV,
wherein a half width of the peak is 1.5 eV or more and 8.0 eV or less,
wherein the peak corresponds to the silicon surface forming charge state of the first negative electrode active material particle in a charged state of 0.6 V (vs. Li/Li+), and
wherein the charged state of 0.6 V (vs. Li/Li+) is based on a constant current charge at 0.05 C, thereafter a constant voltage charge at 0.6 V until a current value is 0.005 C.

2. The negative electrode active material according to claim 1, wherein an X-ray diffraction pattern obtained by measuring the first negative electrode active material particle in the state of 0.6 V (vs. Li/Li+) by an X-ray diffraction method does not have a crystalline peak.

3. The negative electrode active material according to claim 1, further comprising a second negative electrode active material particle including a carbon material.

4. The negative electrode active material according to claim 2, further comprising a second negative electrode active material particle including a carbon material.

5. A negative electrode comprising the negative electrode active material according to claim 1.

6. A negative electrode comprising the negative electrode active material according to claim 2.

7. A negative electrode comprising the negative electrode active material according to claim 3.

8. A negative electrode comprising the negative electrode active material according to claim 4.

9. A secondary battery comprising:
a positive electrode;
a negative electrode; and
an electrolyte,
wherein the negative electrode contains the negative electrode active material according to claim 1.

10. A secondary battery comprising:
a positive electrode;
a negative electrode; and
an electrolyte,
wherein the negative electrode contains the negative electrode active material according to claim 2.

11. A secondary battery comprising:
a positive electrode;
a negative electrode; and
an electrolyte,
wherein the negative electrode contains the negative electrode active material according to claim 3.

12. A secondary battery comprising:
a positive electrode;
a negative electrode; and
an electrolyte,
wherein the negative electrode contains the negative electrode active material according to claim 4.

* * * * *